United States Patent [19]

Hubert

[11] Patent Number: 5,245,703
[45] Date of Patent: Sep. 14, 1993

[54] DATA PROCESSING SYSTEM WITH MULTIPLE COMMUNICATION BUSES AND PROTOCOLS

[75] Inventor: Maurice Hubert, Versaille, France

[73] Assignee: Bull S.A., Versaille, France

[21] Appl. No.: 369,333

[22] Filed: Jun. 21, 1989

[30] Foreign Application Priority Data

Jun. 27, 1988 [FR] France ............................. 88 08578

[51] Int. Cl.$^5$ ........................ G06F 9/06; G06F 9/22; G06F 9/30; G06F 13/42
[52] U.S. Cl. ................................ 395/200; 364/228; 364/229.5; 364/230; 364/238.2; 364/238.3; 364/238.9; 364/239.9; 364/240; 364/240.8; 364/242.94; 364/242.5; 364/243.6; 364/DIG. 1; 395/325; 395/500
[58] Field of Search ... 364/200 MS File, 900 MS File; 395/800, 425, 275, 325, 700, 725, 250, 775, 200, 500

[56] References Cited

U.S. PATENT DOCUMENTS

| | | | |
|---|---|---|---|
| 4,156,796 | 5/1979 | O'Neal et al. | 364/900 |
| 4,162,536 | 7/1979 | Morley | 364/900 |
| 4,188,665 | 2/1980 | Nagel et al. | 364/200 |
| 4,434,459 | 2/1984 | Holland et al. | 364/200 |
| 4,493,021 | 1/1985 | Agrawal et al. | 395/200 |
| 4,631,666 | 12/1986 | Harris et al. | 375/325 |
| 4,774,659 | 9/1988 | Smith et al. | 364/200 |
| 4,872,157 | 10/1989 | Hemmady et al. | 370/60 |
| 4,872,159 | 10/1989 | Hemmady et al. | 370/60 |
| 4,945,471 | 7/1990 | Neches | 395/325 |
| 5,006,978 | 4/1991 | Neches | 395/650 |
| 5,056,015 | 10/1991 | Baldwin et al. | 395/500 |

FOREIGN PATENT DOCUMENTS 0193933 10/1986 European Pat. Off.

OTHER PUBLICATIONS

Computer Design, vol. 22 No. 11, Oct. 1983, pp. 117-123, Winchester, MA, US; R. R. Russ; "Getting the best of both buses".
IEEE Transactions on Nuclear Science vol. NS-30, No. 5, Oct. 1983, pp. 3958-3963, IEEE N.Y. US.
Electro and Mini/Micro Northeast, 23-25 Apr. 1985, p. 1-9, N.Y. US; S. D. Cooper: "Multibus II-A Major Advancement in Multiprocessing".

Primary Examiner—Thomas C. Lee
Assistant Examiner—Daniel H. Pan
Attorney, Agent, or Firm—Weingarten, Schurgin, Gagnebin & Hayes

[57] ABSTRACT

A data processing system is presented, comprising at least one central unit (CPU), at least one central memory (MMU), and internal communication bus to which the CPU and MMU are connected, at least one peripheral unit, a control module (IOM), and an external communication bus to which the peripheral unit and the control module are connected. In this system, the IOM is also connected to the internal communication bus. The internal and external communication buses are of differing types. Within the IOM, the connection to the internal communication bus is via an internal interface device (CLM), while the connection to the external communication bus is via an external interface device (PLM). An inter-device interface (PLI), also within the IOM, connects the CLM and PLM, so as to adapt the protocols of each to the other.

48 Claims, 6 Drawing Sheets

FIG. 3

DATA PROCESSING SYSTEM WITH MULTIPLE COMMUNICATION BUSES AND PROTOCOLS

BACKGROUND OF THE INVENTION

The object of the present invention is a data processing system with interconnection between its central unit and its peripheral units. Current data processing systems consist of central units, processors or central processing units (CPUs) and a central memory consisting of one or several memory units (MMUs), and one or several input/output controllers that permit communication with peripheral units, for example, disk storage, modems, printers, etc. The processors (CPUs) and the central memory units (MMUs) communicate via an internal communication bus in which the protocol is chosen by the host system designer as a function of its architecture. Most often, these protocols are specific and quite varied. In industrial use, on the other hand, bus standards are often seen, such as the IEEE standard "basket base" buses. The most common of these standard buses present at least one parallel communication channel.

The goal of the present invention is a data processing system in which the interconnection assures the interface between buses with different protocols, in a flexible way in order to adapt the internal bus to the system host and in an efficient manner to use the standard buses best in terms of speed, cost and flexibility.

To this end, the invention proposes a data processing system consisting of at least one central unit (CPU) and one central memory (MMU), communicating via an internal communication bus, at least one peripheral unit linked with a control module, hereinafter called IOM module, and at least one interconnection between the IOM module and the internal bus, the system being characterized by the fact that a part of the IOM module is connected to an external communication bus of a different kind than the internal bus and that on the other hand, the interconnection consists of an internal interface device (CLM) connected to the internal bus, an external interface device (PLM) connected to the external bus, an inter-device interface, hereinafter called PLI interface, located between the above-mentioned interface devices (CLM) (PLM), assuring adaptation between the protocols used respectively in the two buses and the PLI interface.

SUMMARY OF THE INVENTION

According to a preferred characteristic of the invention permitting the greatest flexibility of usage for the central interconnection, the protocols used respectively in the two buses and the PLI interface are different, the internal interface device (CLM) assuring the adaptation between the protocols used in the internal bus and the PLI interface, the external interface device PLM assuring adaptation between the protocols used in the external bus and the PLI interface.

The invention also permits a certain number of variants, of which the particular characteristics contribute to improving the efficiency of the interconnection.

According to a first variation of the invention, the PLI interface is the type that presents a parallel communication channel working in the packet message mode (message transmission with header).

Advantageously in this version of the invention, the parallel communication channel of the PLI interface is bi-directional and consists of a synchronization line between the internal (CLM) and external (PLM) interface devices.

According to another version of the invention, the synchronization signal XCL in the PLI interface is generated by a clock (HOR) transmitting via the internal interface device (CLM) and controlling two sequencers (PLS) connected in each of the interface devices (CLM) (PLM).

According to another version of the invention, the PLI interface consists of an independent series channel, controlled by two service controllers (ASC) connected in each of the interface devices (CLM) (PLM) and meant to transmit the commands for initialization and/or service maintenance. This transmission may also be done completely independently of the parallel channel without constraint or blockage of any type.

According to another version of the invention, the data processing system consists of a number of external communication buses of the same type or of different types, each supporting at least one IOM module and an external interface device (PLM) connected to each of the external buses, the above-mentioned interface devices (PLM) being connected by a PLI interface star connecter to a unique internal interface device (CLM) containing the means of connection needed to assure direct communication between the IOM modules connected to the different external buses. It is likewise possible to interconnect a very great number of peripheral devices without overloading the internal bus or modifying the capacity of the IOM modules.

Finally, according to still another version of the invention, the external interface device (PLM) also includes indirect means of communication between the IOM modules and the memory units (MMUs) to assure a "memory server" function at the time of streams of data in response to command messages issued from the IOM module. This characteristic significantly contributes to improving communication between the device and the central memory, notably on the level of peripheral sub-system energy loss and reduction of the IOM module busy time of this sub-system.

Without leaving the scope of the invention, the various versions can be combined one with the other to get the most possible out of the data processing system desired.

BRIEF DESCRIPTION OF THE DRAWING

An implementation method of the invention is now described by way of a non-limiting example with reference to the drawings attached in which:

FIG. 3 represents the formats of the various messages transported on the internal and external bus and the inter-device interface in the course of a direct interface-type communication between an IOM module and the central memory (MMU);

DESCRIPTION OF THE PREFERRED EMBODIMENTS

Figure 1:
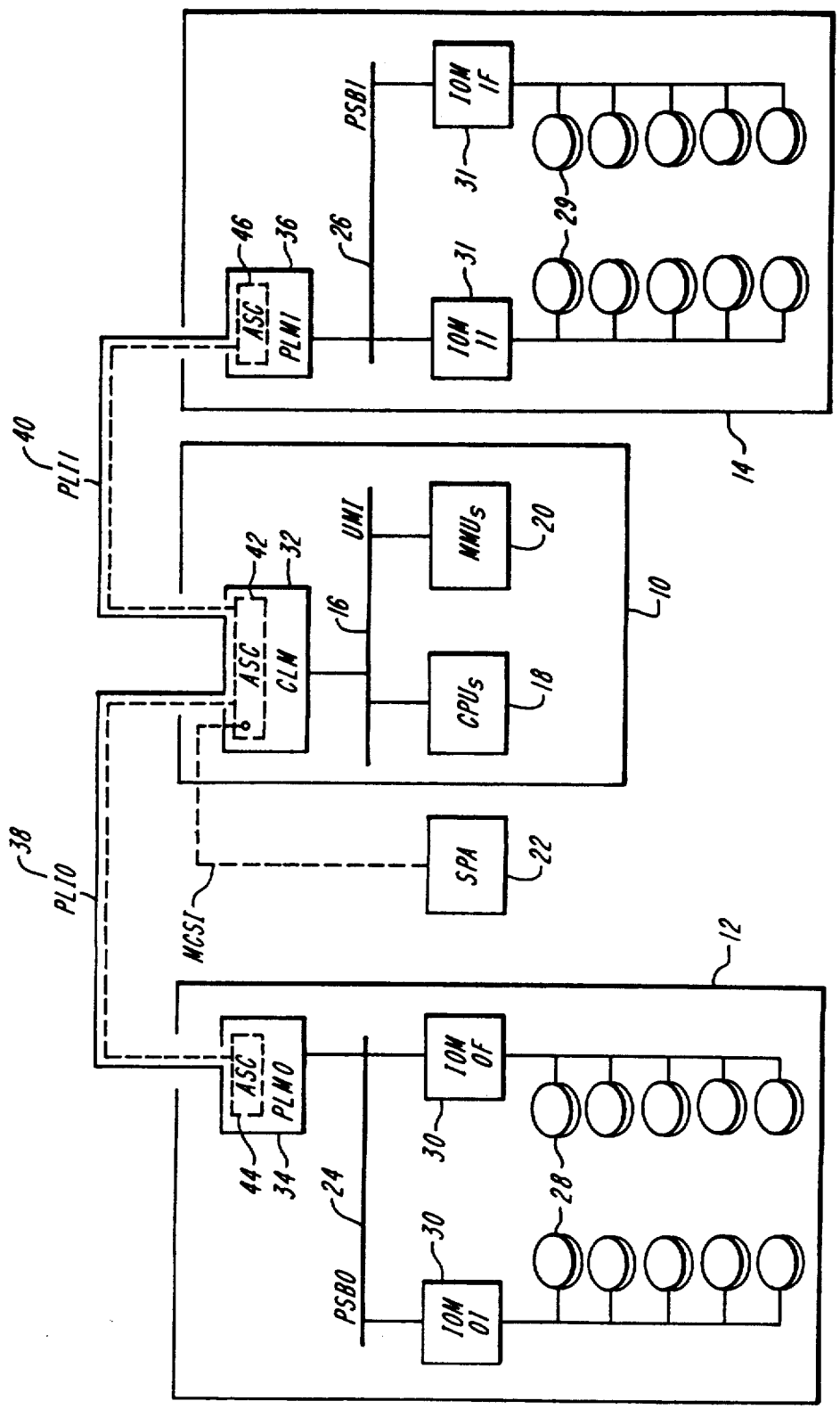
FIG. 1 represents a general diagram of a data processing system according to the invention.

The data processing illustrated in FIG. 1 is represented schematically in the form of three localized physical sub-assemblies, a central sub-assembly 10 and two peripheral sub-assemblies 12 and 14. The central sub-assembly 10 has the central devices of the system grouped around an internal communication bus 16 hereinafter called UMI bus, more particularly one or several central processors (CPUs) 18 and one or more central memory units (MMUs) 20. In the implementation mode of the invention described here, the central devices of the data processing system belong to a machine architecture of the applicant company. According to this architecture, the communication bus UMI is structured according to three separate channels: a command channel (UMI-CMD), an address channel (UMI-AD) and a data channel (UMI-DT) equal to 32 bits of available size. The clock frequency is 7.5 MHZ, assuring it a maximum output of 30 M 8-bit bytes/s.

The sub-assemblies 12 and 14, in a non-limiting number of two, are structured around the external communication buses (24,26) of the same type or of different types. In the implementation mode described here, the external buses are made up of a standard parallel communication channel called PSB. This industry standard is well known today and is described in IEEE Standard 1296, a publication the reader can refer to if necessary. As concerns the standard PSB, its clock frequency is 10 MHz and its output may attain 32 M 8-bit bytes/s in the message mode with data packets of 32 8-bit bytes and close to 40 M 8-bit bytes/s with data packets of 256 8-bit bytes. To each PSB bus, here two in number and called PSB 0 (ref. 24) and PSB 1 (ref. 26), are connected peripheral units 28, 29 of the data processing system. These devices 28, 29, of any type whatever, (auxiliary processing units, for example co-processors, auxiliary central memories, mass memories) are connected to the corresponding PSB via control modules 30,31, hereinafter called IOM modules.

The internal UMI communication bus and every external PSB bus are connected by an interconnection composed of an internal interface device (CLM) 32, connected to the UMI bus, an external interface device (PLM) 34, 36 connected to the PSB bus and an inter-device interface hereinafter called PLI interface, 38, 40. As will be explained in more detail later, each interface consists of a parallel channel PC-PLI (represented with a plain line) and a series channel SC-PLI (represented with a dotted line) controlled at each end with service controllers, hereinafter called controllers (ASC) 42, 44 and 46 incorporated respectively in the internal interface device (CLM) and the two external interface devices (PLM). This series channel, meant for transmitting the initialization and service/maintenance commands to the set of devices connected to the external PSB bus, is connected to the service controller (ASC) 42 of the device (CLM) whose output MCSI is connected to the service processor of the system (not shown). From the design point of view, the PLI parallel channel, with a width of 4 8-bit bytes, may have a maximum length of 2.5 meters with a clock frequency of 16 MHz and a maximum clock frequency of 25 MHz with a length of 0.5 meters. At a frequency of 16 MHz, its useful output (relative to data) may attain 42 M 8-bit bytes/s with blocks of 16 8-bit bytes, 50 M 8-bit bytes/s with blocks of 32 8-bit bytes, 56 M 8-bit bytes/s with blocks of 64 8-bit bytes and close to 64 M 8-bit bytes/s with blocks of 256 8-bit bytes. At a frequency of 25 MHz, the outputs are 66, 80, 88 respectively and closest to 100 M 8-bit bytes/s. Its protocol is the packet message mode type. The PLI series channel works in duplex, at around 15,000 bauds in the asynchronous mode on characters of 8 bits plus parity.

In the implementation mode of the system described here, the number of PSB buses in the system is two. It should be noted that there is no limitation on the number of external PSB buses and corresponding PLI interfaces with regard to the invention. The actual limitations are found on the level of physical capacity of certain system components, for example the internal interface device (CLM) and/or at the level of addressing for identification of the system units. By way of a purely indicative example, the number of central devices (CPUs) and (MMUs) connected to the internal bus can be 30, while the number of PSB peripheral buses may go up to 12 and each PSB bus may have up to 15 IOM modules.

The system described here presents a star structure with two PLI interfaces around a single interface device (CLM) 32, capable of insuring direct communication between all the peripheral units, no matter which PSB buses they are connected to. This very advantageous characteristic on the level of system usage ease will be described in more detail later. In this configuration, the PLI interfaces and the external interface devices (PLM) are identical to each other.

In the remainder of the description and unless stated otherwise, non-specific reference will be made to a single peripheral sub-assembly, a single PSB bus, a single external interface unit (PLM) and a single PLI interface.

In the scope of the invention, the PSB buses work in the message mode like their PLI interface and permit implementing the I/O channel function in the IOM module with regard to the central devices of the system; each of these being able to support one or several physical I/O channels.

In the data processing system according to the invention, the functions realized by the central interconnection (interface devices (CLM) and (PLM) and interface (PLI)) are essentially communication functions of command and data occurrences, realizing as well a communication network between the IOM modules of the PSB and the central system units. If this interconnection permits realization of the I/O channel function on the PSB, the latter is really assured by the IOM modules. However, to facilitate the implementation of the I/O channel function in the IOM modules, the device (PLM) lends help concerning the movement of data with the central memory (MMU), assuring a "memory server"-type communication function. More precisely, referring to FIG. 2, the model of assured "unit" to "unit" communications between active stations, central devices (CPU) and (MMU), IOM modules and devices (PLM) in the "server memory" mode, are divided up as follows:

Type I: IOM/CPU interfaces (interruptions=model (A))

Type II: IOM/MMU interfaces (immediate memory access=Model (B))

Type III: IOM/PLM interfaces (data movements—external phase=model (C))

Type IV: PLM/MMU interfaces (movement of data—internal phase Model (C))

Figure 2A:
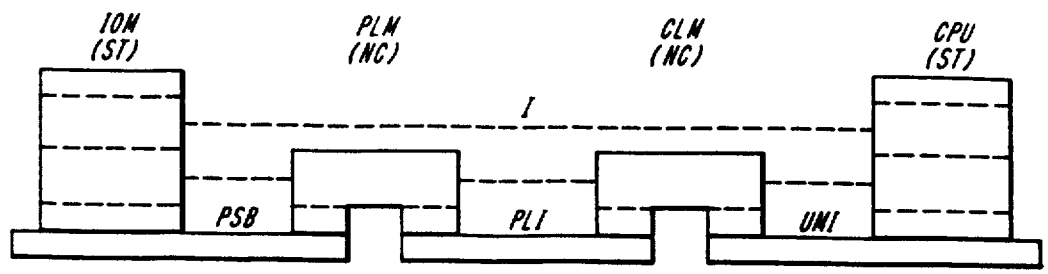
FIG. 2A represents a model of a level I of the communication structure between the central units (central memories (MMUs) and processors (CPUs)) on the internal bus and the peripheral units (IOM modules) on the external bus.
Figure 2B:
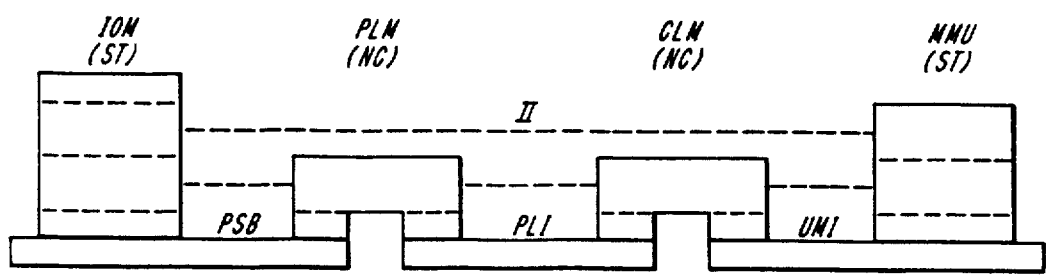
FIG. 2B represents a model of a level II of the communication structure between the central units (central memories (MMUs) and processors (CPUs)) on the internal bus and the peripheral units (IOM modules) on the external bus.
Figure 2C:
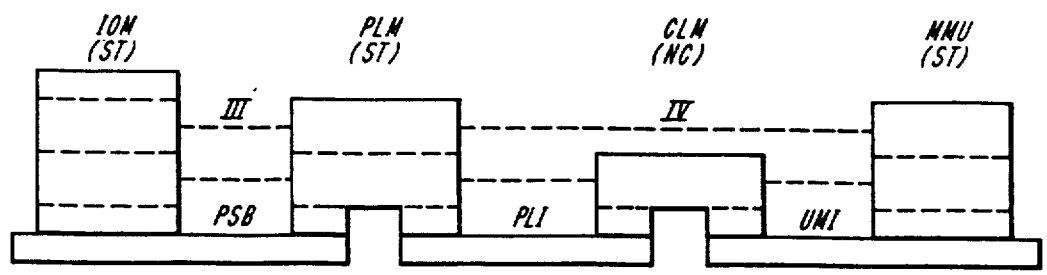
FIG. 2C represents a model of levels III and IV of the communication structure between the central units (central memories (MMUs) and processors (CPUs)) on the internal bus and the peripheral units (IOM modules) on the external bus.

The communication models structured in layers (OSI standards) and illustrated in FIG. 2, show that the device (CLM) always acts as an NC communication node (passive mode) and that the device (PLM) acts either as an NC communication node for Type I and II interfaces (direct messages), or as an ST station (active mode) for the Type III and IV interfaces (indirect messages) when it is used as a "memory server" by the IOM modules.

In a general way, all the messages are unsolicited (of the asynchronous type) with the sole exception of certain messages transported on the PSB bus and concerning "data packets." These messages, called synchronous, which are requested by asynchronous messages, appear in the Type III interfaces (IOM/PLM). The arrival rate of synchronous messages is negotiated between the interface device (PLM) and the IOM module.

Figure 3:
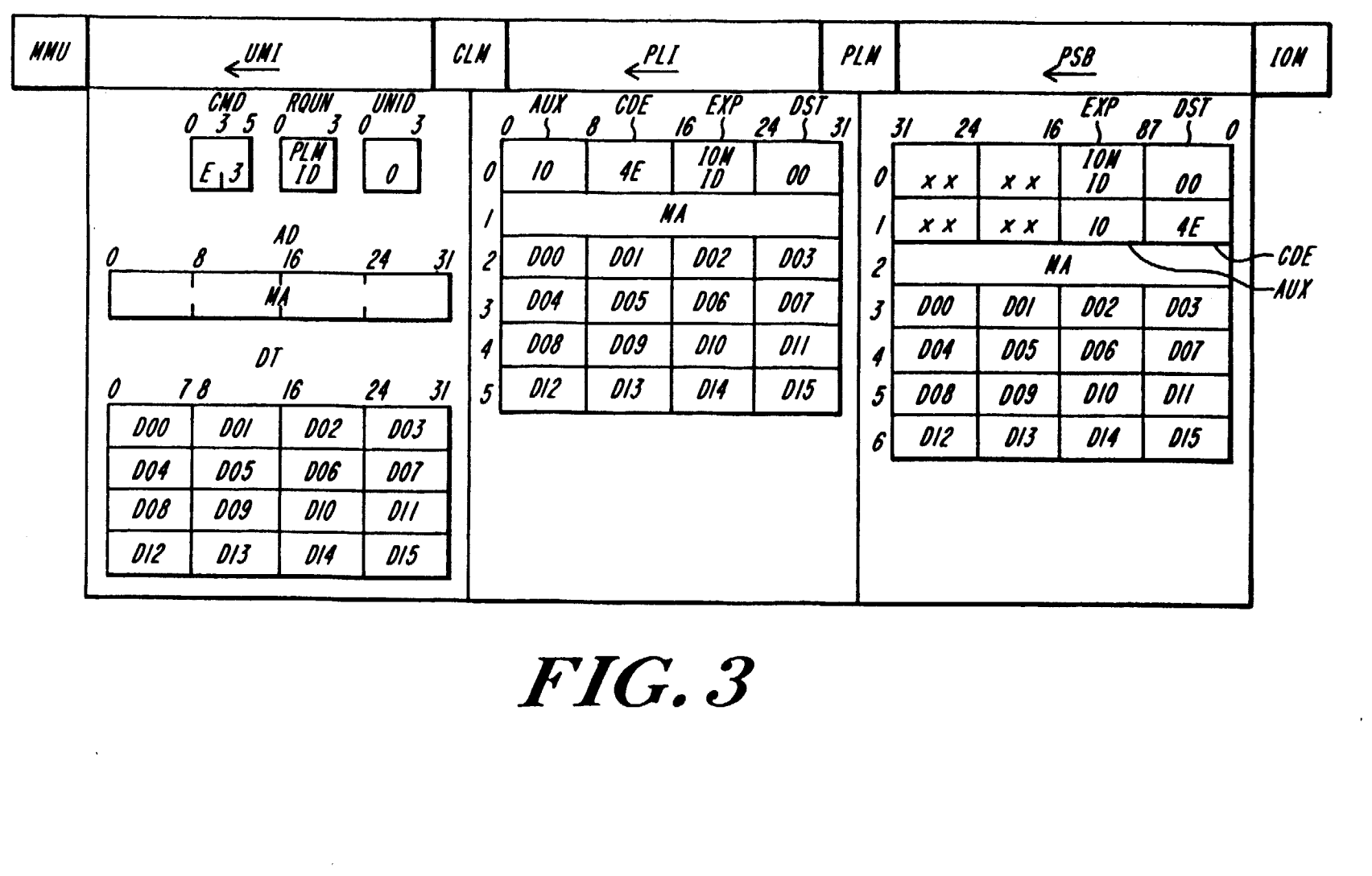

By way of example, FIG. 3 illustrate the formats of various messages transported by the buses UMI, PLI (parallel channel), and PSB in the case of Type II interface (IOM/MMU)—more precisely, writing to central memory at the address MA of a block of data DOO-D15.

If the format of the information transported via the UMI bus is considered, the command channel, composed of lines CMD, RQUN and UNID, the address channel UMI-AD giving the real address MA in the central memory on 32 bits (0-31), and the data channel UMI-DT which can transmit blocks of 16 8-bit bytes are noted. The command channel can be broken down into a field of command properly called "CMD," 6 bits in size (0-3, 4-5), carrying the reference of the operation code, here "E3," an identification field of the sending unit "RQUN", 4 bits in size, carrying the identification reference of the device (PLM) with which the IOM source module of the data block DOO-D15 is associated and an identification line of the destination unit "UNID," 4 bits in size, here carrying the value "0" signifying a direct access to the central system units and completed by the existence of a real MA address in the address channel UMI-AD.

The message formats in the PLI interface and the PSB bus are related and presented in a divisible form in words of 4 8-bit bytes (0-31) with a "header" part and a "data" part. The "header" part of the PLI interface and PSB bus messages contain four primary significant 8-bit bytes assembled in one word (4 8-bit bytes) in the PLI interface and in two words in the PSB bus to conform, in the latter case, to IEEE Standard 1296 : 8-bit bytes No. 1 (DST) and No. 2 (EXP) are reserved for the identification of the destination and sending devices or units (IOM-ID, PLM ID, CPU-ID), 8-bit bytes No. 3 (CDE) and No. 4 (AUX) are reserved for encoding the principal and auxiliary commands also called "operation" codes. The "data" part of the messages follows the header to start, when it exists, at a memory address MA on 32 bits.

In the example illustrated in FIG. 3, the field DST contains the value 00-Hex (hexadecimal notation) signifying direct access to the central system units, the field EXP contains the sender IOM module identifier (IOM-ID), the CDE field contains the value corresponding to the write operation 4E Hex and the code AUX contains the value 10 Hex (which corresponds to the length of the field of significant 8-bit bytes of the write block, that is 16 8-bit bytes in the present case of a total block write). In a general way, the AUX field can be used with various information such as the operation reference given by the devices, for example: IOM ref. or PLM ref.

It should be noted that the header field filler values of the messages on PLI and PSB correspond to the same specifications as the "operation" codes and "identification" codes with regard to ease and efficiency. In the case where PLI and PSB messages concern direct interfaces between central units and IOM modules, the references to fields DST, EXP, CDE and AUX correspond non-specifically to messages on the PLI interface and the PSB bus.

In the following description, and unless specially indicated, references to fields DST, EXP, CDE and AUX will concern "header" parts of the messages on the PLI interface and the PSB bus.

It should be noted that the invention is described with reference to a very specific type of internal bus, the UMI bus. It is understood that without leaving the scope of the invention, the data blocks limited here to 16 8-bit bytes may be enlarged to 256 8-bit bytes without changing the format of the PLI interface messages, notably on the level of field length of the significant 8-bit bytes of a data block (maximum 256 8-bit bytes given by the hexadecimal value 00 Hex in the 8-bit byte corresponding to the complementary code AUX of the "header" part).

The different messages, corresponding to four types of interfaces, will now be presented in brief. In comparison with the messages described by the example illustrated in FIG. 3, the corresponding messages will be developed to take into account the specific features of the interface (for example: certain PLI messages being no more than a word, others not presenting the memory address MA). However, all the messages are presented according to the same, previously described basic structure, notably on the level of the "header" part.

I. IOM/CPU Interfaces

The I/O channels used on the IOM modules, side bus PSB and central unit (CPU), side bus UMI, communicate directly and in both directions via messages of the "interruption" type for notification of events such as: connect, disconnect, end, etc. The information is transmitted on the three physical interfaces, which are the two buses UMI and PSB, and the PLI interface.

For these types of messages, the interface devices (CLM) and (PLM) are transparent, their roles are limited to the transmission of protocols, notably to restructuring the "header" part of the messages.

At the PLI interface, messages are limited to one word. If there is an interruption of the central unit by an IOM module, the fields are coded in the following manner: 00 Hex for DST, IOM-ID for EXP, the operation code 48 Hex for CDE and CPU-ID for AUX. If there is an inverse interruption, the AUX field places a pointer code PC in an I/O table provided in the central memory (MMU). In fact, relevant complementary information on the occurrence reported in this way is obtained by the requested IOM module in a procedure called "mailbox".

II. IOM/MMU Interface

The IOM/MMU interfaces between IOM modules and central memory (MMU) are also called immediate memory access operation. According to the invention, the elementary memory access commands (read, write) are implemented in the form of messages. Thus, the information passes through the three physical interfaces UMI, PLI and PSB in the form of unsolicited messages or requests (asynchronous). In this case, the interface devices (CLM) and (PLM) are likewise transparent with transfer of protocols being their sole function.

The messages or requests to the central memory (field DST=00) can be used to deliver the following information:

a. Command: "Test/Set Block (field CDE=45) or "Read Block" (field CDE=46) or "Write Block" (field CDE=4E) (total or partial).

b. Memory address (MA): Address of the 8-bit byte indicating the start of the memory zone considered.

c. Length of significant 8-bit byte field in the write block (AUX).

d. Data to write (per 16 8-bit byte block).

If a write is successful, the central memory does not send a message in response to the write commands. In contrast, in the opposite case, the response message sends the memory address of the "write block" command and states the cause of the failure.

In the case of a read operation (and including "Test/Set Block"), the response message from the central memory to the IOM module refuses the contents of the block sent to the central memory, reporting, if necessary, the corrected errors or indicating the cause of the failure.

The "write block" command" (which was used as an example of the appearance of messages illustrated in FIG. 2) is sent by the IOM module to the central memory (MMU) with a DST identification of 00 Hex. It is accompanied by the memory address MA and the block of data to write, partially or in total. The first significant 8-bit byte is given by the contents of the less important bits 28-31 of the MA address, the length of the significant 8-bit bytes being contained in the field AUX (value below 10 Hex in the case of partial block write).

The "read block" command is likewise sent to the central memory (MMU) with a DST identification of 00 Hex. It is accompanied by the memory address MA and an IOM command reference (IOM ref.) carried in the AUX field. There are four response commands for the central memory:

Write memory error (field CDE=49): this command sends to the IOM module the memory address MA attached to the non-executed "write block" command with an indication of the failure type in the AUX field.

Block memory return Status 0 (field CDE=40): this command in response to a "read block" command delivers the contents of the memory block requested and indicates the absence of read error.

Block memory return=Status 1 (field CDE=41): this command in response to a "read block" command delivers the contents of the requested memory block and indicates a read error correction.

Memory block return Status 2 (field CDE=42): this command in response to a "read block" command delivers the contents of the requested memory block and indicates the existence of non-correctable errors.

These response messages all have the IOM module identification at the start of the request (IOM-ID) for code DST.

III. IOM/PLM Interfaces

These IOM/PLM interfaces constitute the external phase of global data movement operations at the input or output of the central memory (MMU) in which the IOM/MMU communication is no longer direct but controlled by the device (PLM) which plays the role of "memory server."

Only messages on the PSB bus correspond exclusively to these IOM/PLM interfaces.

These external operations initialized by the transaction messages issued by the IOM modules are placed under the control of the device (PLM). The device (PLM) contains a set of 32 DMA (direct memory access) function servers.

Each server is composed of 11 registers:
 a 16 bit register for "Reference to IOM operation,"
 an 8 bit "memory command" register,
 a 16 bit "transfer length" register (length by 4 8-bit byte word),
 four memory descriptors for channeling the buffers in the central memory, each containing a 16 bit "length" register which would be a half word (length of the 8-bit byte), and a 32 bit "address" register which would be a word (address of the 8-bit byte).

An IOM module can occupy as many DMA function servers as it can request to the limit of their availability. It should be noted that the capacity of the DMA servers to operate in a simultaneous manner depends essentially on the control circuits of the PSB bus and the structure of the device (PLM). By way of example, the device (PLM) described previously with reference to FIG. 6 permits only one input and one output operation simultaneously. These external data movement operations have lengths which may be up to 4 times 64 K 8-bit bytes. The DMA function servers are the "memory servers" which clear the IOM modules and the PSB bus, thus increasing the effective (or useful) output of the PSB bus.

When data is entered in the central memory, the IOM module initializes the operation by sending via PSB an asynchronous message "request buffer input" (field CDE=24) containing a "header" part of two words, also incorporating the requested PLM device identification (PLM-ID) in the DST field, the IOM operation reference (IOM ref.) in the AUX field and a "data" part containing the total length (word No. 2) in a multiple of 4 8-bit bytes (rounded off to next higher multiple) of the data transfer obtained by the sum of the data lengths in the attached memory descriptors and the descriptors (words No. 3 to 8), each containing the length in 8-bit bytes of the corresponding chain of 8-bit bytes, limited to 64 K 8-bit bytes (216 8-bit bytes), and the start address of the 8-bit byte in the main memory where the chain of 8-bit bytes defined by the descriptor is written.

Following this initialization message issued by the IOM modules, there is a series of messages on the PSB bus; in the first place a response message from the device (PLM), either an acknowledgement message "acknowledge buffer input," or a rejection message "reject buffer input," followed in the case of acknowledgement by one or more data transfer messages "packet input" starting from the IOM module, then by a message issued from the device (PLM) announcing the end of the operation "end data input." All these messages are explained below.

Thus the device (PLM) responds by an "acknowledge buffer input" message (field CDE=35) giving field AUX the reference to the DMA function server (PLM ref.), affecting the operation requested by the IOM module. For the "data" part, this message contains a third word (Word No. 2) in which the reference to the IOM operation (IOM ref.) is carried on an 8-bit byte as well as the maximum work rate, also carried on an 8-bit byte. This response ends the transaction sequence and is immediately followed by the IOM module sending the first message "data packet at input" in the synchronous manner. The "header" part of these messages contains the IOM module identification (IOM-ID) in the EXP field, the device (PLM) identification (PLM-ID) in the DST field, a command code (3F Hex modified to 3E Hex for the last packet) in the CDE field and the operation reference (PLM ref.) in the AUX field. The "data" part of these messages is a maximum of 32 8-bit bytes. If the length of the transfer planned is not an exact multiple of 32, the last word is filled with non-significant 8-bit bytes.

The "memory server" function of the PLM is activated automatically before receipt of the first "data packet at input" message. The device (PLM) writes the chain of 8-bit bytes in the central memory bit by bit as it receives the data packets. The device (PLM) writes to the central memory while itself generating on the PLI, according the internal phase of the data movements, the messages called type IV (studied later), which are similar to those that the IOM modules send directly in the immediate access operations (Type II message).

When the write to the central memory of the data received is completed, the device (PLM) sends its message "end data input" and releases the DMA server function. This message, three words long, contains a "header" part which includes in field DST the IOM module identification (IOM-ID), in the EXP field the device (PLM) identification (PLM-ID), in the CDE field the code 4C Hex, finally in field AUX the reference to the operation by the device (PLM) (PLM ref). The "data" part, one word long, consists partly of the IOM operation reference (IOM ref.), the other part being an indication of the operation status (00 Hex if it is successful or a higher value if there is an error). In the latter case, the IOM module is responsible for restarting the entire operation by sending an initialization message "request buffer input."

If there is a rejection by the PLM device of the message "request buffer input" (field CDE=34 Hex), this device sends out a message of which the "data" part, reduced to one word, contains the IOM operation reference (IOM ref.). This rejection can result from a lack of resources on the part of the device (PLM), notably the DMA function servers (less frequent case), but also from a request not conforming to the level of content of the "request buffer input" message. The IOM module will still have to send out a new request.

The data output operations in the external phase on the PSB bus are structured in a manner similar to data input operations and will not be presented in detail in the following descriptions. There are five commands; the same number of message types on PSB correspond to them:

"Request data output" from the IOM module to the device (PLM) to initialize the operation. This message contains, in addition to the operation reference (IOM ref.), the memory descriptors (maximum 4) associated with data transfers (central memory addresses and corresponding lengths of the field of 8-bit bytes to transfer).

"Request buffer output" from the device (PLM) to the IOM module. This message contains, among other things, the references (PLM ref.) of PLM resources (DMA function server) affecting the operation.

"Acknowledge buffer output" or "reject buffer output" from the IOM module to the device (PLM). If there is an acknowledgement, the message specifies the maximum rate of transfer.

"Data packet at output" from the device (PLM) to the IOM module. Before receipt of the "acknowledge buffer output" at the device (PLM) memory server, the latter immediately sends the data stored in the central memory to the IOM via a series of synchronous messages "data packet at output". The transfer of data from the central memory to the device (PLM) is done according to the internal phase of the data movement operation via the messages called Type IV, which are similar to those that the IOM modules send directly in the immediate access operations (Type II message).

As regards the formats of various data output operation messages, these are derived directly from equivalent functional message formats existing in the data entry operations.

IV. PLM/MMU Interfaces

The PLM/MMU interfaces between interface devices (PLM) and the central memory (MMU) correspond to the internal data movement operations phase. Only the messages on the UMI bus and the PLI interface correspond to these interfaces.

The structure of the messages is identical to those of the messages described in the appearance of messages relating to Type II interfaces (immediate access), replacing in each case the role of the IOM module by that of the interface device (PLM) which will be identified by its code (PLM-ID).

The messages of the type utilized in these interfaces, the names of which are listed below, will not be described in detail (the reader has the option of referring to the description of immediate access messages). They are at the start of the interface device (PLM), the messages ("test block," "read block" and "write block") and in response to the central memory "memory write error" and "memory block return, status 0/1/2."

After the presentation of various messages transported between the parallel channels of the internal and external busses of the data processing system according to the invention, the interface devices (CLM) and (PLM) will now be described with reference respectively to FIGS. 4, 5 and 6.

Figure 4:
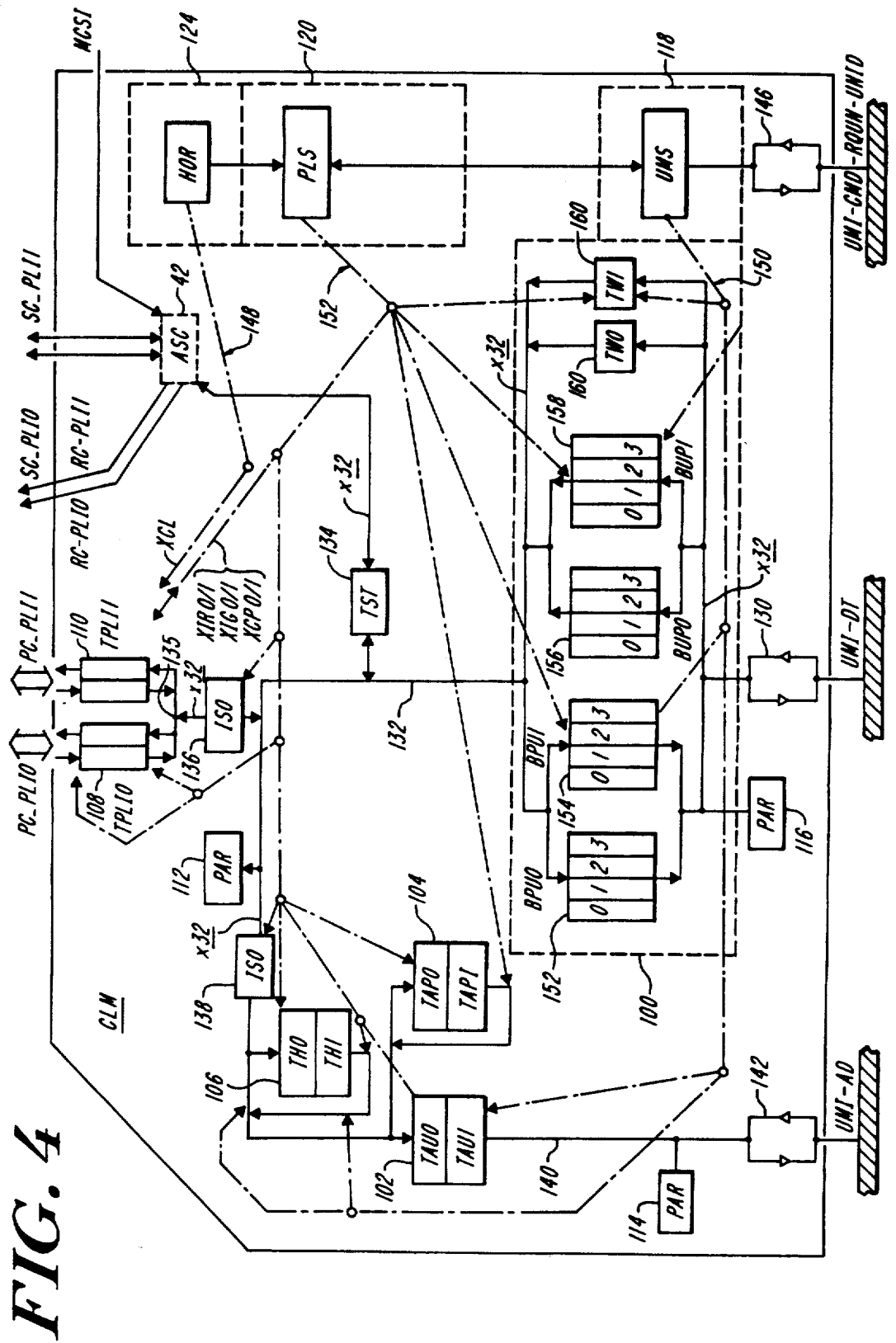
FIG. 4 represents a diagram of the principle of the internal interface device (CLM) illustrated in FIg. 1.

If FIG. 4 is considered, the interface device (CLM) consists of a set of working memories composed of a set of buffer memories 100 meant to receive the data, a pair of auxiliary buffer memories 102, 104 (TAU 0 and TAU 1, TAP 0 and TAP 1) meant to receive the addresses and another auxiliary buffer memory 106 (TH 0 and TH 1) meant to receive the "header" part of the messages transported on the PLI interface.

The device (CLM) likewise contains a set of bi-directional memory ports 108,110 via interface PLI. The set of memory ports 108 and 110 are mounted in a star (in the present case in parallel, taking into account the number of PLI interfaces limited to two) on a node 135 to be connected respectively to parallel channels PC-PLI 0 and PC-PLI 1 of interface PLI.

Even though not shown, the circuits corresponding to these different memories 100,102,104, to the memory ports 108,110 are 32 in number (x32 on FIG. 4) to permit information transfers equal to 4 8-bit bytes, that is, 1 word. On these transfer lines and circuits, properly speaking, four parity lines are attached (one line per 8 bit byte) connected with the parity controllers PAR 112, 114, 116. The interface device (CLM) contains two sequencers, sequencer (UMS) 118 and sequencer (PLS) 120, both synchronized by a clock (HOR) 124. The device (CLM) also contains a service interface subassembly (ASC) 42, organized around a microprocessor Type 8086 connected to series channels SC-PLI 0 and SC-PLI 1 of the two inter device interfaces through the USART 8251 interface circuits (not shown). The subassembly (ASC) 42 in particular manages initialization of the system, test procedures and error procedures.

The buffer memory set 100 is bi directional and is composed, at the input, of two memory circuits BPU 0 (152) and BPU 1 (154) with a capacity of 4 words each and, at the output, of two memory circuits BUP 0 (156) and BUP 1 (158), likewise with a capacity of 4 words, and two memory circuits TW0 and TW1 with a capacity of 1 word, the latter being specially reserved for the transfer of information in the "mailbox" procedure associated with IOM module interruptions by the central units. The memory circuits are mounted in parallel and are connected, on the one hand, to the "data" channel UMI-DT of the UMI bus through port set 130, on the other hand, to the side PLI with one working bus 132. This bus 132 is connected to the sub-assembly (ASC) 42 through a set of ports TST 134, to the set of isolation ports ISO 136 connected to node 135 and to the inputs of the auxiliary buffer set of sets 102, 104 and 106 by another set of insulation ports ISO 138. The auxiliary buffers of sets 102, 104 and 106 each have a capacity of 1 word. Each set consists of as many buffers (here 2) as there are PLI interfaces in the data processing system. The first set of address buffers (TAU 0 and TAU 1) 102 is connected a its output via a bus 140 to the address channel UMI-AD of bus UMI through a set of ports 142. The other set of address buffers (TAP 0 and TAP 1) 104 has its output ringed on bus 132 via the intermediary of port 150 138, the same as the output of the "header" buffer set (TH 0 and TH 1) 106. This latter configuration is used for generation of response messages to the IOM modules and the devices (PLM) in the Type II and I interfaces explained previously. In a similar manner, the port memories of sets 108 and 110 have a capacity of 1 word.

The clock (HOR) 124 delivers two synchronous clock signals, one for the UMI bus, the other reference XCL (see dotted line 148) for the parallel channels of the PLI interfaces. The sequencers (UMS) 118 and (PLS) 120 also work in a synchronous manner with the XCL signal and at the same frequency.

The UMS sequencer (118) is connected to the command channel UMI CMD of the UMI bus through a set of ports 146. In addition to managing priorities on UMI, the sequencer (UMS) 118 controls the UMI side access ports of memories 100 and 102 (see network marked with arrow 150). In addition, the sequencer (UMS) 118 is capable of receiving instructions from the messages (or message headers) contained in auxiliary buffers 106 (TH 0 and TH 1).

The sequencer (PLS) 120 controls the PLI side access ports of memories 100 and 102, the access ports of memories 104 and 106, the memorizing ports 108 and 110 of ports ISO 136 and 138 and the generation and/or receipt of command signals illustrated in FIG. 4 under reference XIR 0/1, XIG 0/1, SCP 0/1 used in the parallel channels of the PLI interfaces on the three additional lines (not shown) on 36 data transmission lines (see network indicated with arrow 152). These three lines, of which the functions will be explained later, are made up of a bi-directional line XCP, a uni-directional send line XIG and a uni-directional receiving line XIR. These lines are connected to the sequencer (PLS) 120 respectively by a set of bi-directional memory ports, a uni-directional memory port and a memory circuit (not shown), all synchronized using the signal XCL issued by clock 124.

The two sequencers (UMS) 118 and (PLS) 120 are implemented in a manner that is entirely wired in the form of programmed logic networks. These logic networks, of which the principle and use are well-known in technology, will not be described in detail here. Clearly, these circuits correspond to as many organizational diagrams as to various messages situations of interest to the device (CLM) 120 and presented before.

If we now consider, by way of example, the case of a read in central memory (MMU) in the immediate access mode, the read command message issued by an IOM module enters into the device (CLM) by the intermediary of the PLI interface (for example PL 0). This message is composed of a header directed to buffer 106 (TH 0) and an address directed to buffers 102 (TAU 0) and 104 (TAP 0). These operations are controlled by the PLS controller 120. The controller UMS 118 then takes the relay, reads the header contained in TH 0 and decodes it to generate the instructions CMD, RQUN and UNID directed to the UMI bus. Similarly, the contents of the buffer TAU 0 is transferred on the UMI-AD channel. Thus requested, the central memory (MMU) responds and loads buffer 156 (BUP 0) under the control of the sequencer (UMS). Similarly, the contents of buffer 106 (TH 0) is modified according to the result of the read operation (return memory block, status 0/1/2).

The PLS sequencer (120) takes control of the operation again and sends, on PLI 0, using buffer 106 (TH 0), the header of the return message to the IOM requestor module followed by the contents of buffer 156 (BUP 0), that is, the data stored in memory. The return phase of the operation which was just described is illustrated in part in the organizational diagram in FIG. 5, explained below.

Figure 5:
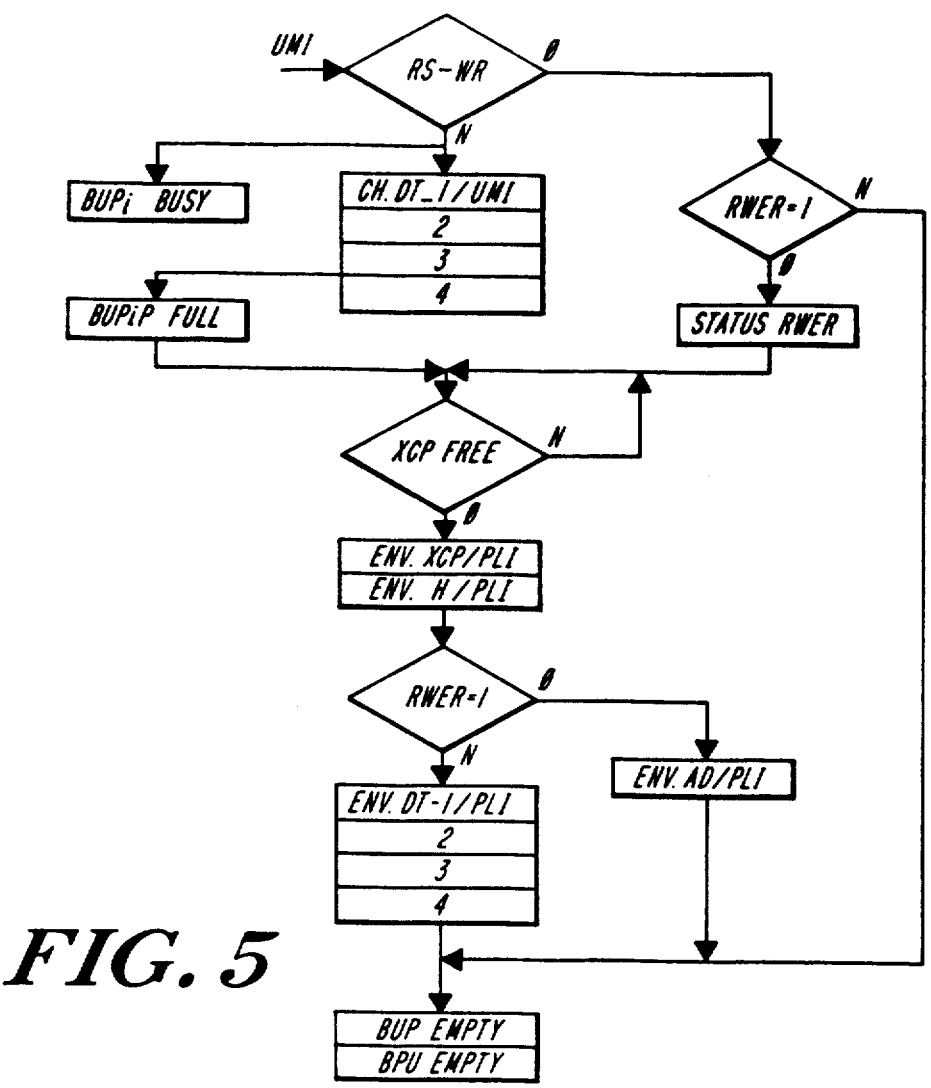
FIG. 5 represents an organizational diagram of a programmed logic network incorporated in the internal interface device (CLM) illustrated in FIG. 4.

Still by way of example, the organizational diagram of FIG. 5 illustrates partially the function of the logic networks programmed in the sequencers (UMS) and (PLS) of the internal interface device (CLM) and which corresponds to a return from central memory (MMU) after an immediate access operation (read or write) requested by an IOM module connected to a PLI data interface. Before receipt of a return from central memory on the UMI bus, the test "RS-WR" (return write) is done. If "RS-WR" is true, the test "RWER = 1" (write error) will then be executed. If "RWER = 1" is false, its output branches directly to the end of the sequence for generation of the "EMPTY" status signals for the different buffers BUP and BPU. (In fact, if the write operation is successful, no message is sent back to the originating IOM module). If "RWER = 1" is true, the branching will be done taking into account the "STATUS RWER" error type; this information is used to fill in the field AUX of the "memory write error" header. The test following "XCP FREE" corresponds to the busy status of the parallel channel of the PLI interface concerned. In the negative, the message remains waiting, in the affirmative, the sequencer (PLS) of the device (CLM) will generate an XCP busy signal for the PLI interface "ENV XCP/PLI," then will proceed with sending the message header using the auxiliary buffer 106 "EVN H/PLI" followed by a second test "RWER=1" (output=true) and with resending on PLI using the auxiliary buffer 104 (TAP) of the memory address indicated in the write command "ENV AD/-PLI" that came from the IOM device. If the "RS-WR" test is false, the situation corresponds to a memory read return with the generation of messages of the "memory block return" type and loading, using UMI-DT, of four data words, "CH DT-1/UMI, etc..," after having generated a busy signal for one of the BUP memory buffers. When the 4th and final word is loaded in this buffer memory, a "BUPi FULL" signal is generated. Branching is then done, based on the busy test of the PLI interface "XCP FREE" and to permit taking the line and sending the response message header, using buffer 106 (TH). The second test "RWER=1" will branch, if its result is negative, from the operation of clearing the BUP memory, to the PLI interface, "ENV DT-1/PLI, etc..". The sequence will end by the generation of "EMPTY" status signals for the BUP and BPU buffers.

Figure 6:
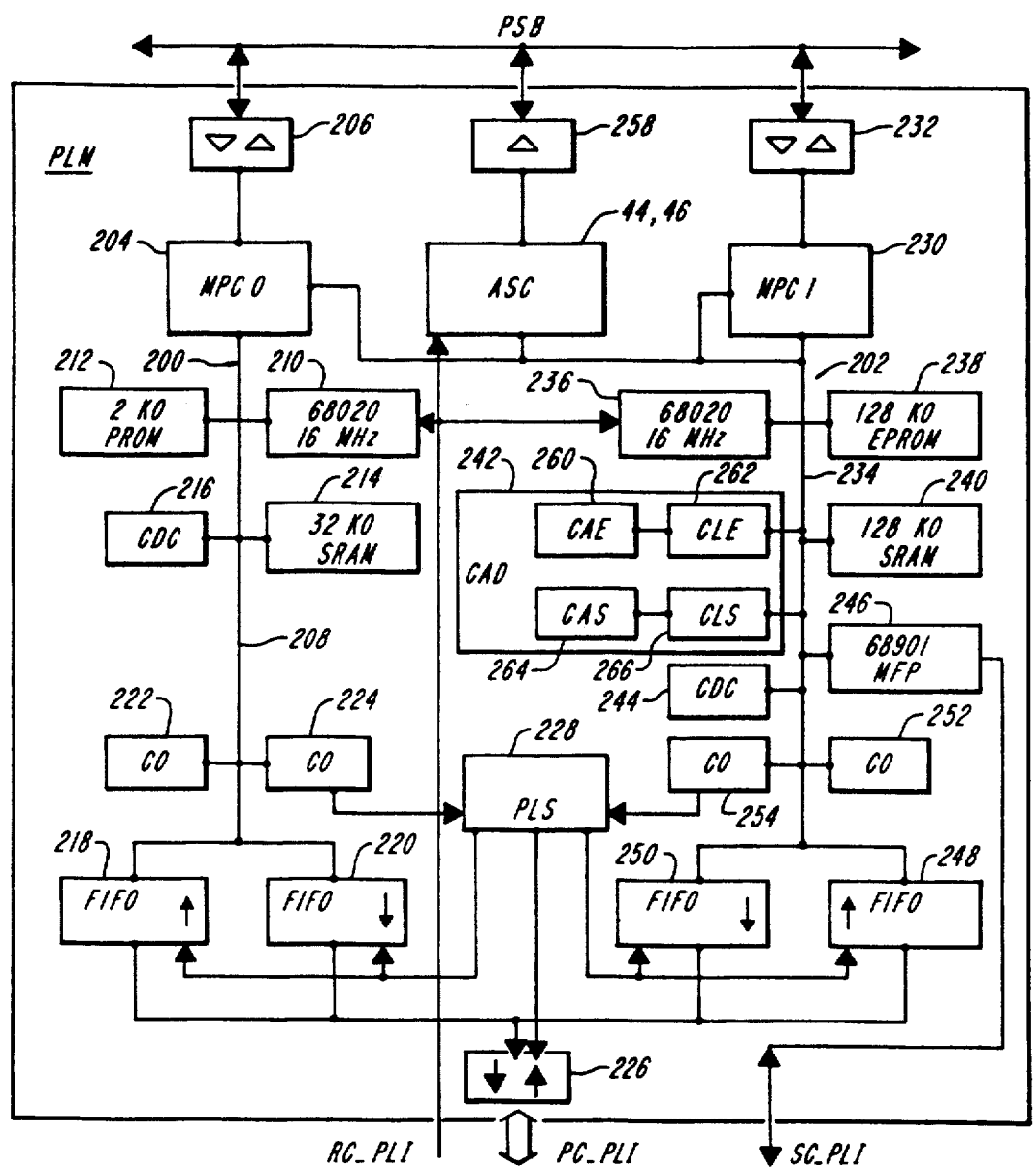
FIg. 6 represents the diagram of the principle of the external interface device (PLM) illustrated in FIG. 1.

If FIG. 6 is now considered, the external interface device (PLM) described contains two chains of communication 200 and 202, mounted in parallel between the PSB bus and the parallel channel of the inter device interface PLI. The chain of communication 200 is made on direct transfers between PSB and PLI in the same way that the chain of communication 202 is made on indirect transfers and particularly on the "memory server" function of the device (PLM).

The direct chain of communication 200 is composed of a message circuit controller (MPC 0) 204, of which the message address is 00 Hex. This type of identifier circuit, of which the definition is given in IEEE Standard 1296, is known in the industry and will not be repeated in detail. The input of the identifier circuit (MPC 0) is connected via a set of bi-directional ports 206 to bus PSB, in such a way that its output is connected to a working bus 208 on which an auxiliary processing unit is connected, which is composed of a microprocessor 210 (32 bits—16 MHz) of the 68020 type and a programmable memory 212 of the pROM type with 2 K 8-bit bytes loaded with instructions for the microprocessor 210, a primary working memory 214 of the SRAM type with large capacity (32 K 8-bit bytes) to permit temporary storage of information, an encoding-decoding unit CDC 216 and a second working memory composed of a pair of registers FIFO 218, 220 with a capacity of 100 32-bit words. An 8 bit control counter 222 is connected to the FIFO input register 218 in such a way that the FIFO output register 220 is connected to another 8 bit control counter 224. At the side of PLI, the two registers FIFO 218, 220 are connected to the parallel channel PC-PLI across a bi-directional circuit interface with memory ports 226. The registers FIFO 218,220 and the memory ports of circuit 226 are maintained and controlled by a sequencer (PLS) 228 of the interface device (PLM), itself controlled by the sequencer (PLS) 120 of the interface device (CLM) and synchronized by clock signal XCL.

The indirect chain of communication 202 is composed of a message controller circuit (MPC 1) 230 of which the message address is the identification code of the device (PLM) considered, that is PLM-ID. The circuit input (MPC 1) is connected by a set of bi-directional ports 232 on the PSB bus in such a way that its output is connected to a working bus 234 on which an auxiliary processing unit is connected, composed of a microprocessor 236 (32 bits—16 MHz) of the type 68020 and a programmable memory of the EPROM type 238 with 128 K 8-bit bytes loaded with instructions meant for microprocessor 236, of a primary working memory 240 of the SRAM type with large capacity (128 K 8-bit bytes) to permit storing information in the "memory server" operational mode, a direct access memory device CAD 242, an encoding decoding unit CDC 244, a multi-function processor circuit (MFP) 246 of the type 68901, and a second working memory consisting of a pair of registers FIFO 248, 250 with a capacity of 100 36-bit words (4 8-bit byte words with their parity). An 8-bit control counter 252 is connected to the FIFO input register 248 in such a way that the FIFO output register 250 is connected to another 8-bit control counter 254. The FIFO registers 248 and 250 are mounted in parallel with the FIFO registers 228 and 220 of the direct chain 200 to be connected to the PC-PLI parallel channel across the interface circuit to memory ports 226. They are likewise controlled by the sequencer (PLS) 228 of the device (PLM). Even though not shown, the three lines XCP, XIR, XIG of the PC-PLI channel are connected, across the interface circuit 226, to sequencer (PLS) 228 of the device (PLM). As regards these three lines, the circuit 226 presents a structure of memory ports and of memory similar to the one already described of the interface connected at the other end of the lines, on the CLM side.

The multi function processor (MFP) 246, which also provides the standard functions of timer interruption and chronometer, is incorporated in the service controller (ASC) 44-46, conveniently connected to the series channel SC-PLI of the PLI interface and aided by the microprocessor 236.

The service controller (ASC) 44-46 has the function of the PSB interface known by the name CSM, for which a definition is given in Standard IEEE 1296. This CSM function involves the connection to the PSB bus by a uni-directional port 258. It is used in the scope of Standard IEEE 1296 at the time of the PSB bus initialization. The service controller (ASC) 44-46 is also used for the procedures and protocols of testing and errors proper of the PSB in the scope of Standard IEE 1296. For this reason, it is connected to two message controller circuits (MPC 0) 204 and (MPC 1) 230. An RC-PLI line coming from the PLI interface permits hot restart (WRS) of the service controller (ASC) 44-46 and microprocessors 210 and 236.

In this same way, the transfer of messages and the adaptation of various protocols in the heart of the PLM device are implemented under the control of programmed microprocessors. The direct chain of communication provides the transfer and management of messages concerned by Type I and II interfaces in the same way that the indirect chain of communication provides the transfer and management of Type III and IV messages. As rewards the incidental messages originating at the PSB, discrimination is done by identification of the message addresses by circuits (MPC) 204 and 230 00-Hex for (MPC 0) and PLM-ID for (MPC 1). Upon return, the Type IV messages meant for the chain of communication 202 are selected by their message address PLM-ID on the level of loading the FIFO register 248. This identification function is used with success and efficiency for the transfer of information between IOM modules (transmitting module IOM-E, receiving module IOM-R) connected to two separate PSB buses (PSB-E and PSB-R). In this situation, the "header" part of the message carries the identification of the PLM-R device. The message will be transmitted by the PLM-E device then by the PLI-E interface to load the memory port of I/O TPLI-E of the device (CLM). At this stage, the message is blocked at the level of node 135 by the isolation ports 136 and will be loaded in the memory port TPLI-R connected to device PLM-R, which recognizes it and takes charge of it. Thanks to this particular feature, one thus obtains a real extension of the exterior communication bus capacity.

As regards the indirect communication chain 202, it should be noted that the transfers of information between the circuit (MPC 1) 230 and the large capacity memory SRAM 240 are governed by the circuit CAD 242, in such a way that the transfers between the memory 240 are governed directly by the microprocessor 236. The circuit CAD 242 (not to be confused with the 32 direct access DMA function servers obtained by the computer at the time of "memory server" function implementation of the device PLM) consists of a set of input counters (CAE) 260 and (CLE) 262 on 16 bits and a set of output counters (CAS) 264 and (CLS) 266 on 16 bits which permits, in the mode of implementation described here, only one input operation and one output operation simultaneously between the IOM module and the device (PLM) in the Type III interfaces. The counters (CAE) 260 and (CAS) 264 are affected by addressing in memory SRAM 240 in such a way that the counters (CLE) 262 and (CLS) 266 are affected by the determination of the length of information blocks to be transferred.

Figure 7:
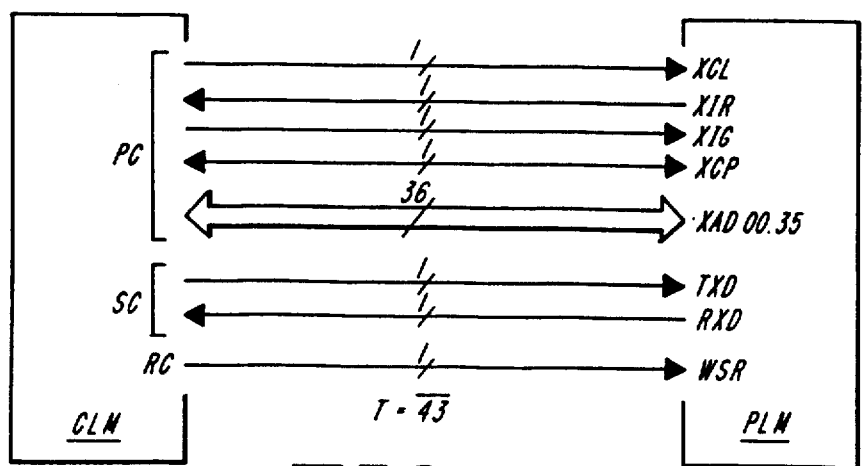
FIG. 7 is a schematic diagram of the inter-device interface PLI illustrated in FIG. 1.

FIG. 7 illustrates a diagram of an inter-device interface PLI (if FIG. 7 is considered, the references to modes PC, SC and RC are indicated at the left in such a way that the references to corresponding signals are indicated on the right). Physically, it is composed of 43 active lines in the form of a flexible interface which can attain several meters. It is composed in part of the two communication channels, a parallel channel PC-PLI (40 lines) and a series channel SC PLI (2 lines), and also in part of a uni-directional line RC-PLI from of the device (CLM) toward the device (PLM) to transport a signal WSR, from the service controller (ASC) 42 of the device (CLM) or of the service processor (SPA) 22 of the host system, linked at its output MCSI, to the service controller (ASC) 44-46 of the device (PLM) during hot restart of the system.

The series communication channel SC assures the interface between the system service processor (SPA) 22 and the controller (ASC) 44-46 and the microprocessors 210 and 236 of the device (PLM) via the controller (ASC) 42 of the device (CLM) and the service interface MCSI (see FIGS. 1 and 3). It consists of two lines: a referenced send line TXD from the device (CLM) (master) to the device (PLM) (slave) and a receive line RXD from the device (PLM) to the device (CLM). These two lines work in the asynchronous mode with characters of 8 bits plus parity, in a chain of 11 occurrences (one per "time" T of the clock), after adding the frames "START" and "STOP," with an output of around 15,000 baud. At the side of PLM, these two lines are governed by the corresponding USART 8251 circuit mentioned above.

The parallel communication channel of the PLI interfaces is composed of 40 lines containing:

the clock transmission signal XCL emitted by the device (CLM), the acknowledgement signals to the device (PLM) from the communication channel XIR and XIG, the bi-directional path "addresses/data" consisting of 36 signals offering a transfer with a size of 4 8-bit bytes with their parity, XAD00-35 and of a path busy signal, XCP.

The lines of the parallel channel PC of the interface PLI are connected to various memory circuits and ports (in particular elements 108-110 and 226) already described and located at each end of the parallel channel in the corresponding devices CLM and PLM.

The transmission frequency can attain 25 MHz by limiting the physical length of PLI to 0.5 meters. With a physical length of 2.5 meters, the maximum permissible frequency drops to 16 MHz. The interval between messages is at least a "time" T of the clock.

The acknowledgement to the device (PLM) from the communication channel is located on the sequencer (PLS) 120 of the device (CLM), the latter using the channel in the standard way. When the device (PLM) wants to send, it activates its request signal XIR. If the device (CLM) does not need the channel (the output memories of ports 108 or 110 being emptied and the input memories of these same ports being ready to receive), the device (CLM) activates its acknowledgment signal XIG via its sequencer (PLS) 120. Appearance of XIG in the device (PLM) requests the immediate deactivation of its XIR except if the device (PLM) wants to keep the channel to link the current cycle to another transmission cycle. The disappearance of XIR from the device (CLM) requests the immediate deactivation of its XIG. If the signal XIG remains present in the device (PLM) after sending its message, the latter may continue to send, immediately linking the following transmission cycle.

On the XAD00-35 path, messages are transmitted by bursts of 4 8-bit bytes in parallel at each clock time XCL of the transmission cycle. The "header" part H of the message is transmitted at time "0" of the cycle and the following, if it exists, is transmitted at the following time(s). The appearance of signal /XCP/ indicates the start of transmission of a message on a parallel channel of PLI and its disappearance indicates the end of the transmission. This signal /XCP/ indicates the busy status of lines XAD.

All the signals /XIR/, /XIG/, /XCP/ and /XADi/ are clocked when sent and received by the interface device (CLM) o (PLM) concerned, using the clock synchronization signal XCL sent by CLM.

The data processing system that was just described by way of example can, without leaving the scope of the invention, give rise to a certain number of variations either on the level of design of the controller devices, or on the level of protocols used in the different buses. On this latter point, the modular structure of the central interconnection according to the invention permits either a simple reconfiguration of the system or an appropriate partial adaptation to each type of bus (internal or external) without completely redesigning the interconnection for each particular application.

What is claimed is:

1. A data processing system having:
    an internal communication bus defining a first protocol;

a processing unit (CPU) in communication with said internal communication bus;

a central memory in communication with said internal communication bus;

at least one external communication bus defining a second protocol;

at least one peripheral unit;

at least one control module in communication with said external communication bus and each control module in communication with at least one of said at least one peripheral unit an interconnection effecting interconnection between said control module and said internal communication bus, said interconnection including an internal interface device directly connected to said internal communication bus and transferring information according to said first protocol;

an external interface device directly connected to said external communication bus and transferring information according to said second protocol;

an interdevice communication link transferring information according to a third protocol and interconnecting said external interface device and said internal interface device, said internal interface device assuring adaptation between said first protocol and said third protocol for communication between said internal interface device and said interdevice communication link and said external interface device assuring adaptation between said second protocol and said third protocol for communication between said external interface device and said interdevice communication link; and said control module further including address detection and generation means for selectively addressing said external interface device and at least one of said external communication bus and said internal communication bus, said external interface device including detection means for detecting said selective addressing and in response thereto operating as a transparent communication node to effect communication between said control module and at least one of said external communication bus and said internal communication bus, upon said at least one of said external communication bus and said internal communication bus being addressed, said external interface device alternatively operating as a memory server to effect direct memory access between said control module and said central memory upon said external interface device being addressed.

2. A data processing system according to claim 1, wherein:

said inter-device interface is a parallel communication channel for transmitting messages having a header part and a data part.

3. A data processing system according to claim 2, wherein:

said parallel communication channel is bi-directional.

4. A data processing system according to claim 3, wherein said parallel communication channel further comprises:

a synchronization line connected between said internal interface device and said external interface device.

5. A data processing system according to claim 4, wherein said internal interface device further comprises:

a clock for generating a synchronization signal on said synchronization line.

6. A data processing system according to claim 5, wherein said internal interface device further comprises:

a first sequencer responsive to said synchronization signal.

7. A data processing system according to claim 6, wherein said external interface device further comprises:

a second sequencer responsive to said synchronization signal.

8. A data processing system according to claim 7, wherein said internal interface device further comprises:

a plurality of internal interface working memories having a plurality of corresponding first memory ports connected to said parallel communication channel and said first sequencer, said memory ports responsive to said first sequencer.

9. A data processing system according to claim 8, wherein said external interface device further comprises;

a plurality of working memories having a plurality of external interface corresponding second memory ports connected to said parallel communication channel and said second sequencer, said memory ports responsive to said second sequencer.

10. A data processing system according to claim 9, wherein said internal communication bus further comprises:

a command channel, an address channel, and a data channel; and said plurality of internal interface working memories further comprises;

a plurality of corresponding third memory ports connected to said address channel and said data channel.

11. A data processing system according to claim 10, wherein said internal interface device further comprises:

a third sequencer connected to said command channel and responsive to said synchronization signal for loading and clearing of said plurality of internal interface working memories.

12. A data processing system according to claim 11, wherein said plurality of internal interface working memories further comprises:

a first auxiliary buffer memory communicative with said first memory ports for receiving said headers form said inter-device interface;

a second auxiliary buffer memory communicative with said third memory ports for receiving an address from said address channel; and a plurality of bi-directional buffer memories communicative with said third memory ports for receiving data from said data channel.

13. A data processing system according to claim 9, wherein said external interface device further comprises:

a large capacity memory having inputs and outputs, and connected between said external communication bus and said inter-device interface; and a processing unit for controlling said input and output of said large capacity memory.

14. A data processing system according to claim 13, wherein said plurality of working memories further comprises:

a plurality of bi-directional FIFO registers communicative with said large capacity memory and controlled by said second sequencer of said external interface device.

15. A data processing system according to claim 14, further comprising:
a plurality of said external communication buses, each having at least one said peripheral unit and at least one said external interface device, each connected thereto; and
said system including only one internal interface device having means for providing direct communication between said peripheral units.

16. A data processing system according to claim 15, wherein said means for providing direct communication comprises:
a node connected to said plurality of first memory ports; and
a plurality of isolation ports responsive to said first sequencer and connected between said node and said plurality of working memories.

17. A data processing system according to claim 1, wherein said inter-device interface comprises:
an independent series channel for communicating the initialization and service maintenance requests.

18. A data processing system according to claim 17, wherein said internal interface device further comprises:
a service controller connected to said independent series channel.

19. A data processing system according to claim 17, wherein said external interface device further comprises:
a service controller connected to said independent series channel.

20. A data processing system according to claim 1, further comprising:
at least one additional external communication bus; and
corresponding additional means for communication between said internal communication bus and said external communication bus, including an additional said external interface device connected to said external communication bus, and an additional said inter device interface connecting said internal interface device with said additional external interface device for providing transparent communication between said control modules connected to said external communication buses.

21. A data processing system as claimed in claim 1, wherein:
at least one said peripheral unit is an auxiliary central memory.

22. A data processing system as claimed in claim 1, wherein:
at least one said peripheral unit is a mass memory.

23. A data processing system, comprising:
an internal communication bus;
a processing unit in communication with said internal communication bus;
a central memory in communication with said internal communication bus;
a first external communication bus;
at least one control module in communication with said first external communication bus;
a second external communication bus;
an additional control module in communication with said second external communication bus, including means for recognizing an address;
means for communication between said internal communication bus and said first external communication bus, including an internal interface device directly connected to said internal communication bus and transferring information according to a first protocol, an external interface device directly connected to said first external communication bus and transferring information according to a second protocol, and an inter-device interface connecting said internal interface device with said external interface device and transferring information according to a third protocol, said internal interface device assuring adaptation between said first protocol and said third protocol for communication between said internal interface device and said interdevice communication link and said external interface device assuring adaptation between said second protocol and said third protocol for communication between said external interface device and said interdevice communication link;
means for communication between said internal communication bus and said second external communication bus;
means in said at least one control module for providing an address on said first external communication bus;
means in said external interface device for providing a first mode of operation including transparent communication service between said at least one control module and said additional control module;
means in said external interface device for providing a second mode of operation including memory server access by said at least one control module to said central memory; and
means in said external interface device responsive to said means for providing an address for selecting between said first and second modes of operation.

24. A data processing system according to claim 23, wherein:
said inter-device interface is a parallel communication channel for transmitting messages having a header part and a data part.

25. A data processing system according to claim 24, wherein:
said parallel communication channel is bi-directional.

26. A data processing system according to claim 25, wherein said parallel communication channel further comprises:
a synchronization line connected between said internal interface device and said external interface device.

27. A data processing system according to claim 26, wherein said internal interface device further comprises:
a clock for generating a synchronization signal on said synchronization line.

28. A data processing system according to claim 27, wherein said internal interface device further comprises:
a first sequencer responsive to said synchronization signal.

29. A data processing system according to claim 28, wherein said external interface device further comprises:

a second sequencer responsive to said synchronization signal.

30. A data processing system according to claim 29, wherein said internal interface device further comprises:
a plurality of internal interface working memories having a plurality of corresponding first memory ports connected to said parallel communication channel and said first sequencer, said first memory ports responsive to the first sequencer.

31. A data processing system according to claim 30, wherein said external interface device further comprises:
a plurality of external interface working memories having a plurality of corresponding second memory ports connected to said parallel communication channel and said second sequencer, said second memory ports responsive to said second sequencer.

32. A data processing system according to claim 31, wherein said internal communication bus further comprises:
a command channel, an address channel, and a data channel; and
said plurality of internal interface working memories further comprises a plurality of corresponding third memory ports connected to said address channel and said data channel.

33. A data processing system according to claim 32, wherein said internal interface device further comprises:
a third sequencer connected to said command channel and responsive to said synchronization signal for loading and clearing of said plurality of internal interface working memories.

34. A data processing system according to claim 33, wherein said plurality of internal interface working memories further comprises:
a first auxiliary buffer memory communicative with said first memory ports for receiving said headers from said inter-device interface;
a second auxiliary buffer memory communicative with said third memory ports for receiving an address from said address channel; and
a plurality of bi-directional buffer memories communicative with said third memory ports for receiving data from said data channel.

35. A data processing system according to claim 29, wherein said external interface device further comprises:
a large capacity memory having inputs and outputs, and connected between said external communication bus and said inter-device interface; and
a processing unit for controlling said inputs and outputs of said large capacity memory.

36. A data processing system according to claim 35, wherein said plurality of working memories further comprises:
a plurality of bi-directional FIFO registers communicative with said large capacity memory and controlled by said second sequencer of said external interface device.

37. A data processing system according to claim 36, further comprising:
a plurality of said external communication buses, each having at least one control module and at least one external interface device, each connected thereto; and said system including only one internal interface device having means for providing direct communication between the control modules.

38. A data processing system according to claim 37, wherein said means for providing direct communication comprises:
a node connected to said plurality of first memory ports; and
a plurality of isolation ports responsive to said first sequencer and connected between said node and said plurality of working memories.

39. A data processing system according to claim 23, wherein said inter-device interface comprises:
an independent series channel for communicating initialization and service maintenance requests.

40. A data processing system according to claim 39, wherein said internal interface device further comprises:
a service controller connected to said independent series channel.

41. A data processing system according to claim 39, wherein said external interface device further comprises:
a service controller connected to said independent series channel.

42. A data processing system comprising:
an internal communication bus;
a first external communication bus;
a second external communication bus;
at least one internal unit connected to said internal communication bus;
at least one external unit connected to said first external communication bus;
an additional external unit connected to said second external communication bus, including means for recognizing an address;
means for communication between the internal communication bus and said first external communication bus, including an internal interface device connected to said internal communication bus and communicating according to a first protocol, an external interface device connected to said first external communication bus and communicating according to a second protocol, and an inter-device interface connecting said internal interface device with said external interface device and communicating according to a third protocol, said internal interface device assuring adaptation between said first protocol and said third protocol for communication between said internal interface device and said interdevice communication link and said external interface device assuring adaptation between said second protocol and said third protocol for communication between said external interface device and said interdevice communication link;
means for communication between said internal communication bus and said second external communication bus;
means in said external unit for providing an address on said first external communication bus;
means in said external interface device for providing a first mode of operation including transparent communication service between said external unit and said additional external unit;
means in said external interface device for providing a second mode of operation including memory server access by said external unit to said central memory; and means in said external interface device responsive to said means for providing an address for selecting between said first and second modes of operation.

43. A data processing system as claimed in claim 42, wherein:
said external unit comprises an auxiliary processing unit.

44. A data processing system as claimed in claim 42, wherein:
said external unit comprises a co-processor.

45. A data processing system as claimed in claim 42, wherein:
said external unit comprises an auxiliary central memory.

46. A data processing system as claimed in claim 42, wherein:
said external unit comprises a mass memory.

47. A data processing system as claimed in claim 1, wherein:
at least one said peripheral unit is an auxiliary processing unit.

48. A data processing system as claimed in claim 1, wherein:
at least one said peripheral unit is a co-processor.

* * * * *

UNITED STATES PATENT AND TRADEMARK OFFICE
CERTIFICATE OF CORRECTION

PATENT NO. : 5,245,703
DATED : September 14, 1993
INVENTOR(S) : Maurice Hubert

It is certified that error appears in the above-indentified patent and that said Letters Patent is hereby corrected as shown below:

Column 11, line 40, "connected a its" should read --connected at its--.

Column 11, line 48, "and I" should read --and IV--.

Column 12, line 27, "PL 0" should read --PLI 0--.

Column 13, line 47, "pROM" should read --PROM--.

Column 14, line 62, "As rewards" should read --As regards--.

Column 16, line 52, "(CLM) o (PLM)" should read --(CLM) or (PLM)--.

Signed and Sealed this

Thirteenth Day of September, 1994

Attest:

BRUCE LEHMAN

Attesting Officer     Commissioner of Patents and Trademarks